United States Patent [19]

Fenton

[11] 4,244,725
[45] Jan. 13, 1981

[54] GLASSWARE HANDLING SYSTEMS

[75] Inventor: Frank A. Fenton, Doncaster, England

[73] Assignee: Emhart Industries, Inc., Farmington, Conn.

[21] Appl. No.: 38,368

[22] Filed: May 11, 1979

[30] Foreign Application Priority Data

May 31, 1978 [GB] United Kingdom ............... 25918/78

[51] Int. Cl.³ ............................................ C03B 35/12
[52] U.S. Cl. ........................................ 65/260; 65/77; 198/490; 414/744 R
[58] Field of Search ............................ 65/260, 111, 77; 414/744, 744 R, 744 A, 744 B, 744 C; 198/490

[56] References Cited

U.S. PATENT DOCUMENTS

| 1,835,570 | 12/1931 | Lorenz | 65/260 X |
| 1,935,739 | 11/1933 | Freese | 65/260 X |
| 2,253,155 | 8/1941 | Wadman et al. | 65/260 |

*Primary Examiner*—Arthur D. Kellogg
*Attorney, Agent, or Firm*—H. Samuel Kieser

[57] ABSTRACT

A glassware handling system transfers formed articles of glassware from a blow station of a glassware forming machine to conveying means and comprises two heads each of which is capable of releasably holding a plurality of articles of glassware. The heads are supported for reciprocatory movement in a carriage which is movable to allow the heads to remove the glassware from the blow station in turn, whereby the transfer of formed articles of glassware from the blow station to the conveying means is shared between the two heads, thereby enabling a high rate of transfer to be achieved.

10 Claims, 4 Drawing Figures

GLASSWARE HANDLING SYSTEMS

BACKGROUND OF THE INVENTION

This invention relates to glassware handling systems for use with glassware forming machines and to methods of operating such systems.

In a typical glassware forming machine, parisons are formed from gobs of molten glass in a parison mould at a blank station of the machine, the parisons being transferred from the blank station to a blow station at which a blow mould is located, the parisons whilst in the blow mould being blown into the final shape of the desired article of glassware. The formed articles of glassware are then moved from the blow mould to a deadplate for cooling, after which the articles are conveyed to a lehr mat on which they stand whilst annealing takes place.

British patent specification No. 1,491,859 discloses a glassware forming machine having three stations, namely a blank station at which the parisons are formed, an intermediate station at which the parisons are further formed and a blow station at which the parisons are blown into their final shape. Specification No. 1,491,859 explains that the provision of an intermediate station enables glassware to be produced at a higher rate than is possible with a two station machine of the form disclosed in U.S. Pat. No. 1,911,119. If full advantage is to be taken of this higher production rate, the articles of glassware must be transferred from the blow station to the lehr mat at a similar higher rate.

SUMMARY OF THE INVENTION

According to one aspect of the invention a glassware handling system for transferring formed articles of glassware from a blow station of a glassware forming machine to conveying means comprises a plurality of heads each of which is capable of releasably holding an article, or a plurality of articles, of glassware, the heads being supported for reciprocatory movement in a carriage which is movable to allow the heads to remove the glassware from the blow station in turn, whereby the transfer of formed articles of glassware from the blow station to the conveying means is shared between the plurality of heads. When the handling system is intended to be used with a multi-gob glassware forming machine, each head is capable of holding a like plurality of articles of glassware. When used with a single gob glassware forming machine, each head need be capable of holding a single article only of glassware.

It is envisaged that the conveying means would normally be constituted by a lehr mat, but the conveying means could alternatively be a conveyor which conveys the articles of glassware to a lehr mat.

According to another aspect of the invention there is provided a glassware forming machine in combination with a glassware handling system for transferring formed articles of glassware from a blow mould of the machine to a spaced lehr mat, the system comprising a carriage extending between the blow mould and the lehr mat in the direction of transfer of the articles from the blow mould to the lehr mat, guide means permitting translational movement of the carriage in a substantially horizontal direction which is substantially perpendicular to said direction of transfer, the carriage carrying two heads each of which is capable of releasably holding the glassware and each of which is reciprocable with respect to the carriage between the blow mould and the lehr mat, and actuating means which are operative to translate the carriage between a first position in which the reciprocatory path of one of the heads is aligned with the blow mould so that the said one head is able to take out the glassware from the blow mould, and a second position in which the reciprocatory path of the other of the heads is aligned with the blow mould so that the other head is able to take out the glassware from the blow mould, the actuating means reciprocating the heads in timed relationship with translation of the carriage to enable the two heads to take out the glassware from the blow mould in alternate sequence and to deposit the glassware on the lehr mat in alternate sequence.

According to a further aspect of the invention there is provided a method of transferring formed articles of glassware from a blow mould of a glassware forming machine to a lehr mat, comprising using two heads each of which reciprocates in a carriage to carry the glassware from the blow mould to the lehr mat, the carriage shifting between two alternative positions to enable first one head and then the other head to take out glassware from the blow mould in continuing succession.

By using a plurality of heads, a glassware handling system according to the invention is able to cope with the rate at which articles of glassware are formed in the blow moulds of a triple station machine of the form disclosed in British patent specification No. 1,491,859. However, a glassware handling system according to the invention may be used with other types of glassware forming machine, including the more conventional two station machine disclosed in U.S. Pat. No. 1,911,119.

The actuating means, which may be hydraulic or pneumatic in operation, preferably comprise a piston and cylinder device for translating the carriage and two further piston and cylinder devices which are movable with the carriage and which respectively reciprocate the two heads. Each of the further piston and cylinder devices is preferably such that movement of the corresponding head towards the lehr mat is interrupted for a period of time to allow cooling and/or coating of the article of glassware being transferred. Translational movement of the carriage may occur during this period of time.

In a preferred embodiment of the invention, each head comprises means for lifting the article of glassware in its passage from the blow mould to the lehr mat. In the case of a machine designed for multi-gob operation, each head may also comprise means for pivoting the articles of glassware, about a substantially vertical axis, to enable the articles of glassware to be deposited on the lehr mat in a compact manner.

BRIEF DESCRIPTION OF THE DRAWINGS

The invention will now be further described, by way of example, with reference to the accompanying drawings which show a glassware handling system associated with an individual section of a multiple section glassware forming machine. In the drawings.

DESCRIPTION OF THE PREFERRED EMBODIMENT

Figure 1:
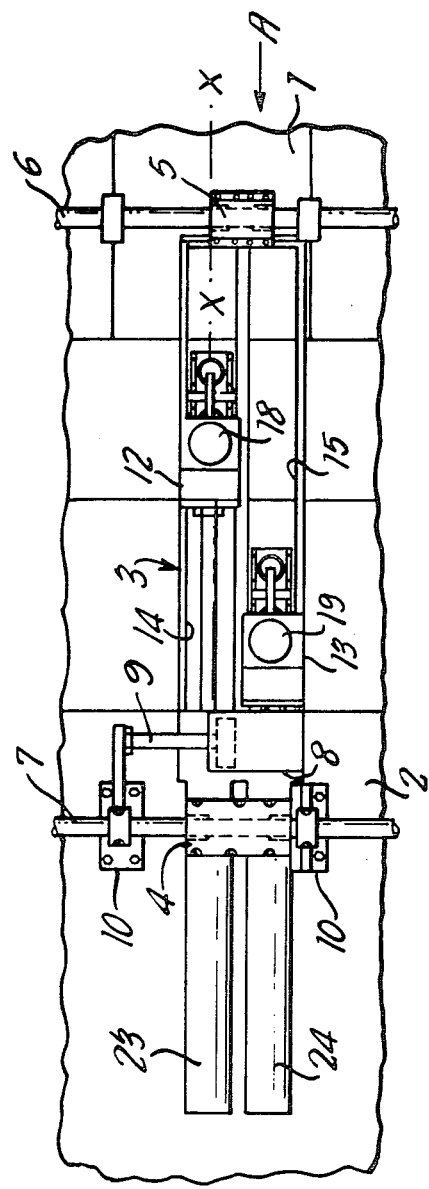
FIG. 1 is a fragmentary plan view of the glassware handling system and adjacent portions of the machine section and lehr mat.
Figure 2:
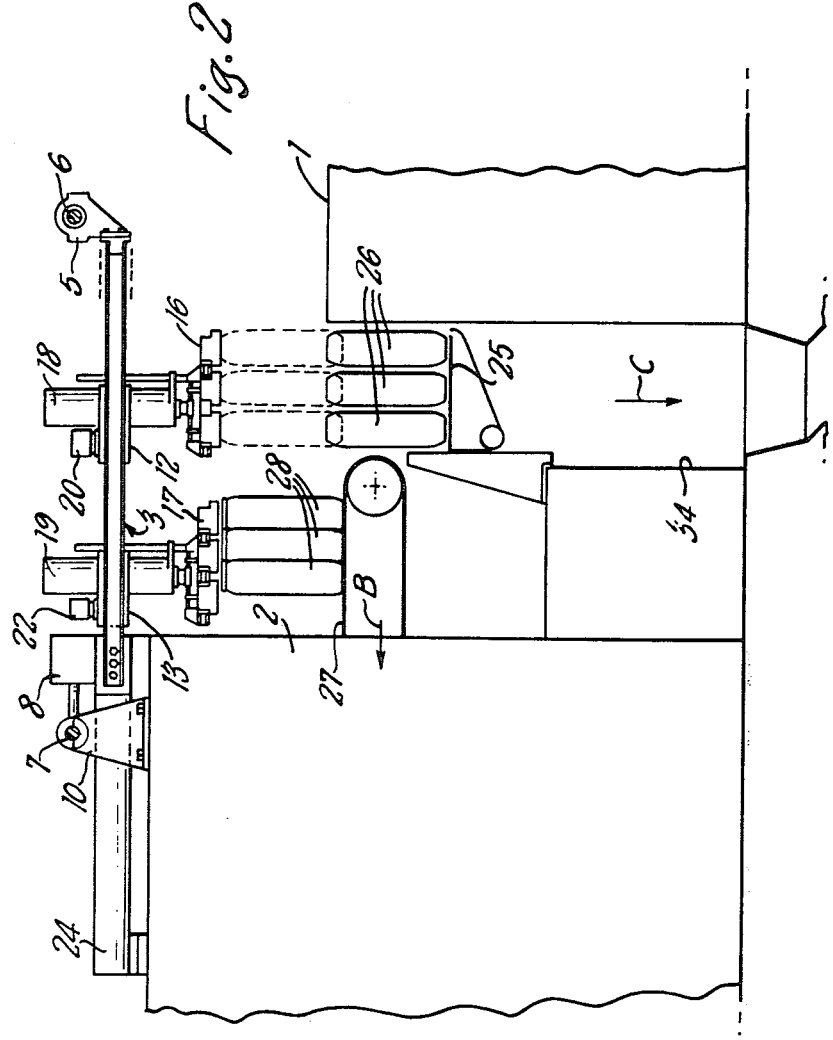
FIG. 2 is a side view of the structure shown in FIG. 1.

The glassware forming machine with which the handling system is used is similar to the machine disclosed in British patent specification No. 1,491,859 in that each individual section comprises three horizontally spaced stations, namely a blank station at which parisons are formed in upwardly open parison moulds from gobs of molten glass, an intermediate station at which the parisons are further formed and a blow station at which are located blow moulds in which the parisons are blown into the desired shape of the article of glassware. In FIGS. 1 and 2 the blow station is indicated at 1, it being understood that the intermediate and blank stations (not shown) are disposed to the right of the blow station 1. The individual machine section shown in the accompanying drawings (unlike the machine section disclosed in British patent specification No. 1,491,859) is designed for triple gob operation, that is to say the gob feeder of the machine feeds three gobs of molten glass simultaneously to three parison moulds at the blank station, the three parisons being transferred simultaneously to the intermediate station for reheating and then simultaneously to three blow moulds at the blow station.

The glassware handling system spans the space between the blow station and a lehr 2 which serves all the sections of the machine. The glassware handling system comprises a carriage 3 including end bearing slides 4 and 5 respectively slidable on horizontally spaced and horizontally extending rods 7 and 6 both of which are fixed. The rod 6 extends above the blow stations of all the machine sections, and the rod 7 extends above the lehr 2. The two rods 6 and 7 form guide means permitting translational movement of the carriage in a horizontal direction perpendicular to the centreline X—X of the three blow moulds at the blow station 1, the line X—X also representing the centre line of the machine section. The carriage 3 is moved to and fro along the rods 6 and 7 by means of a pneumatic piston and cylinder device, the cylinder 8 of which is mounted on the carriage 3 and the piston rod 9 of which is secured to one of a series of fixed brackets 10 which serve to support the rod 7.

The carriage 3 supports two heads 12 and 13 which are slidable in respective slideways 14 and 15 defined by spaced guide rails which are parallel to the direction X—X. The heads 12 and 13 are thus slidable in parallel directions perpendicular to the direction of translational movement of the carriage 3 along the guide rods 6 and 7. Each head 12 or 13 includes a set of three tongs 16 or 17, opening and closing movement of which is controlled by a corresponding pneumatic piston and cylinder device 18 or 19 mounted on the head. The piston and cylinder devices 18 and 19 are also capable of controlling the vertical positions of the sets of tongs 16 and 17 in a manner to be described hereinafter. Each head 12 or 13 carries a further pneumatic cylinder 20 or 22 which is rotary in type and operative to pivot the corresponding set of tongs 16 or 17 about a vertical axis.

The heads 12 and 13 are slidable independently along the respective slideways 14 and 15 under the control of two pneumatic piston and cylinder devices 23 and 24 which extend horizontally above the lehr 2. Each of the devices 23 or 24 is of the "three position" type, that is to say the piston of the device moves to an intermediate dwell position at which it remains stationary before continuing its travel within the cylinder. During this dwell period, the corresponding head 12 or 13 is disposed over a deadplate 25 positioned between the blow station 1 and the lehr 2.

When the glassware handling system shown in the drawings is used with the machine section described in British patent specification No. 1,491,859, the machine is modified by the omission of the second combined blowhead and tong mechanism (designated 34 in British specification No. 1,491,859) and the omission of the deadplate and conveyor. It will be appreciated that the tongs 16 and 17 perform the function of the tongs of the second combined blowhead and tong mechanism of British patent specification No. 1,491,859 and that take out of the articles from the blow moulds is effected in timed relationship with opening of the blow moulds, in a manner similar to that disclosed in British specification No. 1,491,859. In order to blow the parisons at the blow station 1, a separate blow head (not shown) is provided at the blow station, this blow head oscillating between an operative position above the blow moulds and beneath the rod 6, and an inoperative position clear of the blow moulds.

With the carriage 3 in the position shown in FIG. 1, the head 12 is aligned with the centreline X—X of the blow moulds at the blow station 1. Prior to the head 12 being stationary at the position shown in FIG. 1, the head 12 moves over the blow moulds at the blow station 1 and the tongs 16 close around the finishes of the three articles of glassware (i.e. bottles) in the three blow moulds. The tongs may move with an arcuate or with an in-line motion. For either type of motion, bottom plates of the blow moulds may be raised to lift the bottles in order that the tongs 16 can grip the finishes. The blow moulds open and the three bottles are lifted clear of the bottom plates by small upward movement of the tongs 16 as a result of actuation of the device 18. Alternatively, the bottom plates may be lowered, clearing the bottoms of the bottles hanging in the tongs 16. The head 12 then moves, under the control of the piston and cylinder device 23, to the position shown in FIG. 1, the set of tongs 16 carrying the three bottles and then supporting the bottles over the deadplate 25 in the position shown in full lines at 26 in FIG. 2. The bottles remain hanging over the deadplate 25 during the dwell period of the device 23, this interruption in the transfer of the bottles providing deadplate hanging time. The cylinder 8 is moved (upwardly as viewed in FIG. 1) as a result of pneumatic pressure applied to the cylinder 8, causing the carriage 3 to move to its alternative position in which the other head 13 is aligned with the centre-line X—X of the blow moulds. The head 13 moves towards the blow moulds (under the control of the device 24) in order to collect the next set of three bottles, whilst the bottles 26 carried by the head 12 are subjected to extra deadplate hanging and (optionally) to coating.

The bottles are then lifted, by operation of the piston and cylinder device 18, to the position shown in broken lines in FIG. 2, i.e. to the height of the lehr mat 27 which is a continuously moving belt on which the bottles stand as they are transported through the lehr 2 for annealing of the bottles. (If the lehr mat 27 is below the level of the blow moulds, the bottles are lowered by means of the device 18, so that the bottles are at the correct height to be deposited on the lehr mat). The head 12 then continues its motion towards the lehr 2 under the control of the device 23. When the head 12 is positioned over the lehr mat 27 its motion along the slideway 14 ceases, and the cylinder 20 is operated in order to rotate the tongs 16 and the three bottles carried thereby through a small angle of the order of 40° about a vertical axis. The cylinder device 18 is then operated to release the tongs 16 which deposit the bottles on the lehr mat 27 which moves slowly and continuously so as to transport the bottles through the lehr in the direction of the arrow B in FIG. 2. The tongs 16 are lifted clear of the finishes of the bottles and rotated back to the original position in which the centres of the three tongs 16 are aligned in a direction perpendicular to the direction of translational motion of the carriage 3. This position is shown in FIG. 2 for the head 13, FIG. 2 also illustrating at 28 the disposition of the bottles as they are deposited on the lehr mat 27. The head 12 then moves back towards the blow station 1, the carriage 3 being shifted back to the position shown in FIG. 1 so that the head 12 is ready to collect the next set of three bottles from the three blow moulds at the blow station.

Hence, the two independently operating heads 12 and 13 share between them the transfer of the bottles from the blow station 1 to the lehr 2, the heads 12 and 13 taking the bottles out of the blow moulds in alternate sequence and depositing the bottles on the lehr mat 27 in alternate sequence.

Figure 3:
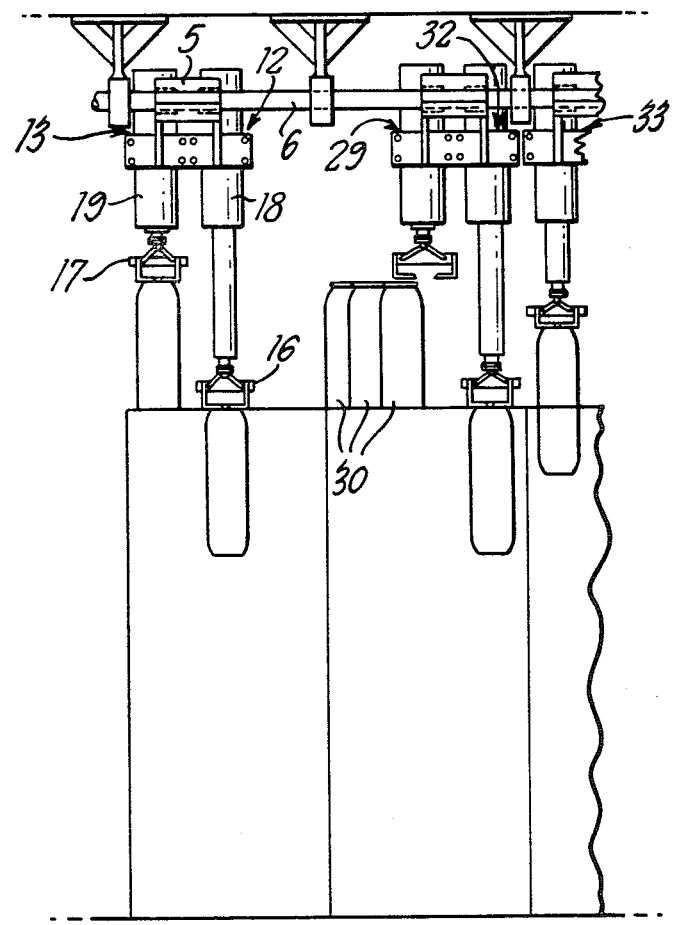
FIG. 3 is a view looking in the direction of the arrow A in FIG. 1 but showing the glassware handling system associated with a plurality of sections of the machine.

FIG. 3 shows the set of tongs 17 carried by the head 13 in the raised position, and the set of tongs 16 carried by the head 12 in the lowered position, the head 12 being aligned with the centre line X—X. The head 29 at an adjacent machine section has deposited its three bottles 30 on the lehr mat 27 and is returning to collect three more from the blow moulds, whilst the other head 32 at the same machine section is supporting the bottles above the deadplate. The adjacent head 33 of the next machine section is in the process of lifting the bottles to the height of the lehr mat.

By pivoting the tongs 16 and 17 about a vertical axis, the bottles can be stacked on the lehr mat in a compact chevron pattern which utilises the available width of the lehr mat 27. The small angle of the order of 40° through which the tongs are pivoted is chosen to afford compact stacking for the three bottles carried by each head. In the case of a machine designed for double gob operation, the tongs preferably rotate the bottles through 90° so that the two bottles carried by each head are placed across the width of the lehr mat 27.

If any bottle which could not stand upright where allowed to reach the lehr mat 27 it would knock over a large number of other properly formed bottles in the compact array of bottles on the lehr mat 27. To avoid this, the bases of the bottles are inspected automatically at the deadplate 25 and if any one of the group of three bottles has a defective base the three tongs of the set are opened and the deadplate 25 is pivoted, causing the three bottles to be rejected as cullet and to fall through a chute (FIG. 2) as indicated by the arrow C in FIG. 2.

Figure 4:
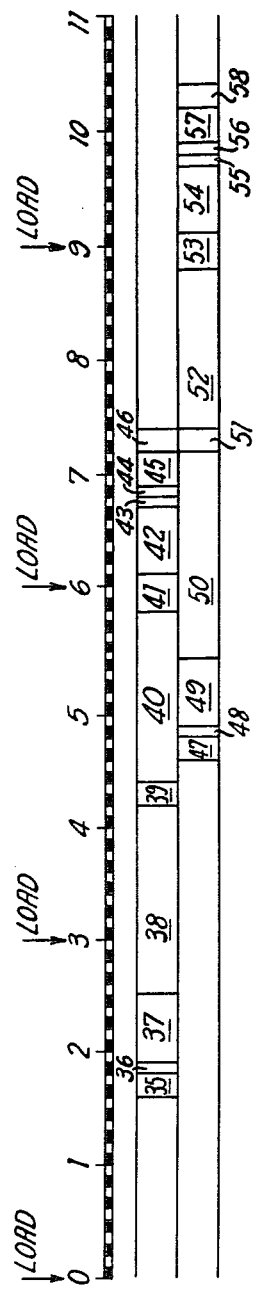
FIG. 4 is a timing diagram.

FIG. 4 is a timing diagram the upper horizontal time scale of which is marked in seconds and the two horizontal strips of which represent the sequence of movement of the two heads 12 and 13 respectively. The time datum is a representative instant at which gobs of molten glass are fed into the three parison moulds at the blank station, this instant and successive such instants being indicated by LOAD in FIG. 4. The operational sequence of the head 12, shown by the upper of the two horizontal strips in FIG. 4, is then:

| Time (Secs.) | Operation | Reference in FIG. 4 |
|---|---|---|
| 1.5 to 1.7 | Tongs 16 close and blow moulds open | 35 |
| 1.7 to 1.8 | Head 12 lifts bottles from blow station | 36 |
| 1.8 to 2.4 | Head 12 moves to intermediate position over deadplate 25 | 37 |
| 2.4 to 4.2 | Head 12 supports bottles over deadplate 25 for deadplate hanging | 38 |
| 4.2 to 4.4 | Carriage 3 shifts on guide rods 6 and 7 | 39 |
| 4.4 to 5.8 | Carriage supports bottles for extra deadplate hanging | 40 |
| 5.8 to 6.1 | Head 12 lifts bottles | 41 |
| 6.1 to 6.7 | Head 12 moves to position over lehr mat 27 and rotates bottles about vertical axes | 42 |
| 6.7 to 6.8 | Tongs 16 open to deposit bottles on lehr mat 27 | 43 |
| 6.8 to 6.9 | Tongs 16 are raised to clear deposited bottles | 44 |
| 6.9 to 7.2 | Tongs 16 are rotated and head 12 moved back towards blank station | 45 |
| 7.2 to 7.4 | Carriage 3 shifts | 46 |

The head 12 continues its movement towards the blow station 1 between 7.4 and 7.6 seconds.

Starting at time 7.6 seconds, the above sequence is repeated. The above sequence of operations 35 to 46 is also followed by the head 13 as shown by the numerals 47 to 58, the sequence for the head 13 being later than the sequence for the head 12 by three seconds so as to match the three second cycle at the blow station.

A handling system according to the invention could be made to match a two second cycle at the blow station by shortening by one second the extra deadplate hanging time (indicated by periods 40 and 52 in FIG. 4).

The handling system is preferably operated in the required sequence by an electronic control system which also controls the sequential operation of the remainder of the glassware forming machine, the take-out of the bottles from the blow moulds being the event used to link the operation of the handling system and the machine section.

By using two heads, each head can move at half the speed which would be necessary for a single transfer having the same output of bottles. This enables deadplate hanging (i.e. cooling) time to be incorporated. A further advantage of the described arrangement is that the bottles are only handled once, in contrast to known methods which involve a succession of depositing and pushing operations. The speed with which the bottles are transferred to the lehr means that the bottles are hotter on reaching the lehr mat than in known systems. As a result, the heating period in the lehr can be shortened. The described system replaces the following parts of a conventional ware handling system: the take out mechanism; the conveyor, deadplate and pushers; the conveyor extension and transfer wheel; the hot end coater; the stacker; and the associated electrical drive system.

I claim:

1. A glassware forming machine in combination with a glassware handling system for transferring formed articles of glassware from a blow mould of the machine to a spaced lehr mat, the system comprising a carriage extending between the blow mould and the lehr mat in the direction of transfer of the articles from the blow mould the the lehr mat, guide means permitting translational movement of the carriage in a substantially horizontal direction which is substantially perpendicular to said direction of transfer, the carriage carrying two heads each of which is capable of releasably holding the glassware and each of which is reciprocable with respect to the carriage between the blow mould and the lehr mat, and actuating means which are operative to translate the carriage between a first position in which the reciprocatory path of one of the heads is aligned with the blow mould so that said one head is able to take out the glassware from the blow mould, and a second position in which the reciprocatory path of the other of the heads is aligned with the blow mould so that the other head is able to take out the glassware from the blow mould, the actuating means reciprocating the heads in timed relationship with translation of the carriage to enable the two heads to take out the glassware from the blow mould in alternate sequence and to deposit the glassware on the lehr mat in alternate sequence.

2. A glassware forming machine in combination with a glassware handling system according to claim 1, wherein the actuating means comprise a piston and cylinder device for translating the carriage and two further piston and cylinder devices which are movable with the carriage and which respectively reciprocate the two heads.

3. A glassware forming machine in combination with a glassware handling system according to claim 2, wherein each of the further piston and cylinder devices is such that movement of the corresponding head towards the lehr mat is interrupted for a period of time to allow cooling and/or coating of the glassware being transferred.

4. A glassware forming machine in combination with a glassware handling system according to claim 3, wherein translational movement of the carriage occurs during said period of time.

5. A glassware forming machine in combination with a glassware handling system according to claim 1, wherein each head comprises means for lifting or lowering the glassware in its passage from the blow mould to the lehr mat.

6. A glassware forming machine in combination with a glassware handling system according to claim 5, wherein the machine is designed for multi-gob operation and each head comprises means for pivoting the articles of glassware, about a substantially vertical axis, to enable the articles of glassware to be deposited on the lehr mat in a compact manner.

7. A glassware forming machine in combination with a glassware handling system for transferring formed articles of glassware from a blow mold of the machine to a spaced discharge surface, the system comprising a carriage extending between the blow mold and the discharge surface in the direction of transfer of the articles from the blow mold to the discharge surface, guide means permitting translational movement of the carriage in a substantially horizontal direction which is substantially perpendicular to said direction of transfer, the carriage carrying two heads each of which is capable of releasably holding the glassware and each of which is reciprocable with respect to the carriage between the blow mold and the discharge surface, and actuating means which are operative to translate the carriage between a first position in which the reciprocatory path of one of the heads is aligned with the blow mold so that said one head is able to take out the glassware from the blow mold, and a second position in which the reciprocatory path of the other of the heads is aligned with the blow mold so that the other head is able to take out the glassware from the blow mold, the actuating means reciprocating the heads in timed relationship with translation of the carriage to enable the two heads to take out the glassware from the blow mold in alternate sequence and to deposit the glassware on the discharge surface in alternate sequence.

8. A glassware forming machine in combination with a glassware handling system according to claim 7, wherein each head comprises means for lifting or lowering the glassware in its passage from the blow mold to the discharge surface.

9. A glassware forming machine in combination with a glassware handling system according to claim 8, wherein the machine is designed for multi-gob operation and each head comprises means for pivoting the articles of glassware, about a substantially vertical axis, to enable the articles of glassware to be deposited on the discharge surface in a compact manner.

10. A glassware forming machine in combination with a glassware handling system according to claim 7, wherein the actuating means comprise a piston and cylinder device for translating the carriage and two further piston and cylinder devices which are movable with the carriage and which respectively reciprocate the two heads.

* * * * *